United States Patent
Lanier et al.

(10) Patent No.: US 7,846,405 B2
(45) Date of Patent: Dec. 7, 2010

(54) METHOD AND APPARATUS FOR MEASURING AND CONTROLLING SELECTIVE CATALYTIC REDUCTION (SCR) EMISSION CONTROL SYSTEMS

(75) Inventors: William Steven Lanier, Durham, NC (US); Frederic Francis Ahlgren, Highland Heights, OH (US); Theodore Paul Kircher, Richmond Heights, OH (US)

(73) Assignee: General Electric Company, Schenectady, NY (US)

( * ) Notice: Subject to any disclaimer, the term of this patent is extended or adjusted under 35 U.S.C. 154(b) by 1269 days.

(21) Appl. No.: 10/851,867

(22) Filed: May 21, 2004

(65) Prior Publication Data

US 2005/0260761 A1 Nov. 24, 2005

(51) Int. Cl.
*B01D 53/56* (2006.01)
*C01B 21/20* (2006.01)

(52) U.S. Cl. .................. 423/210; 423/239.1; 423/403

(58) Field of Classification Search .................. 436/55, 436/116–118; 422/62, 83–93, 168–183; 423/235, 385, 400, 402, 403, 210, 239.1
See application file for complete search history.

(56) References Cited

U.S. PATENT DOCUMENTS

| | | |
|---|---|---|
| 4,645,653 A | 2/1987 | Kimura |
| 4,893,468 A | 1/1990 | Hines |
| 4,949,538 A | 8/1990 | Iasillo et al. |
| 5,139,982 A | 8/1992 | Ayala et al. |
| 5,165,241 A | 11/1992 | Joshi et al. |
| 5,251,447 A | 10/1993 | Joshi et al. |
| 5,323,604 A | 6/1994 | Ekstedt et al. |
| 5,351,477 A | 10/1994 | Joshi et al. |
| 5,364,606 A | 11/1994 | Hung |
| 5,511,375 A | 4/1996 | Joshi et al. |
| 5,590,529 A | 1/1997 | Joshi et al. |
| 5,596,873 A | 1/1997 | Joshi et al. |
| 5,613,363 A | 3/1997 | Joshi et al. |
| 5,816,049 A | 10/1998 | Joshi |
| 5,865,024 A | 2/1999 | Kress et al. |
| 6,206,685 B1 | 3/2001 | Zamansky et al. |
| 6,471,506 B1 | 10/2002 | Zamansky et al. |
| 6,604,474 B2 | 8/2003 | Zamansky et al. |
| 6,737,033 B1 * | 5/2004 | Hofmann et al. .......... 423/239.1 |
| 7,166,262 B2 * | 1/2007 | Buzanowski ............. 423/239.1 |
| 2003/0082822 A1 * | 5/2003 | Lanier et al. ................ 436/118 |

OTHER PUBLICATIONS

A.L. Kohl and R.B. Nielsen, Gas Purification, 5th ed., Elsevier, Houston, Texas, ch. 10, p. 904-930.*

* cited by examiner

*Primary Examiner*—George Wyszomierski
*Assistant Examiner*—Mark L Shevin
(74) *Attorney, Agent, or Firm*—Armstrong Teasdale LLP (57) ABSTRACT

A method for monitoring and/or controlling performance of a selective catalytic reduction (SCR) emission control system includes injecting a quantity of a pollution neutralizing gas into a combustion gas stream containing a pollutant gas. The method also includes passing the stream over a catalyst bed to facilitate a reaction of the pollution neutralizing gas with the pollutant gas to produce an effluent and measuring a ratio of the pollution neutralizing gas to the pollutant gas in the effluent.

23 Claims, 7 Drawing Sheets

METHOD AND APPARATUS FOR MEASURING AND CONTROLLING SELECTIVE CATALYTIC REDUCTION (SCR) EMISSION CONTROL SYSTEMS

BACKGROUND OF THE INVENTION

This invention relates generally to pollution reduction systems, and more particularly to methods and apparatus for monitoring and controlling selective catalytic reduction emission control systems.

Two issues faced by owners and operators of facilities equipped with Selective Catalytic Reduction (SCR) systems include proper control of the ammonia distribution across the face of the catalyst (or to different SCR modules) and deterioration of the SCR catalyst.

An SCR is capable of achieving high levels of $NO_x$ destruction by injecting controlled quantities of ammonia into the $NO_x$-laden gas stream and passing the mixture across a catalyst at a controlled temperature. The primary $NO_x$ destruction reaction in an SCR can be described as:

$$4NO+4NH_3+O_2 \rightarrow 4N_2+6H_2O$$

As indicated by this reaction, optimum $NO_x$ destruction occurs when the molar flow of ammonia is essentially equal to the molar flow of NO. If there is a deficiency in ammonia, then the $NO_x$ will not be completely destroyed. If there is excessive ammonia flow, then the ammonia (considered a hazardous air pollutant in several states) will pass through the system unreacted. This is referred to as ammonia slip. In general, SCR systems are equipped with hardware to continuously measure the molar flow rate of $NO_x$ coming to the catalyst. That data are used to calculate and control the appropriate amount of ammonia to inject into the system at any point in time. A grid of spray nozzles (referred to as an Ammonia Injection Grid or AIG) is provided to distribute the ammonia across the flow field and (hopefully) to provide the proper mixture of $NH_3$ and $NO_x$ at the face of the catalyst. One of the first challenges faced during start up of a new SCR system is to achieve proper balancing of the AIG. The optimal approach for meeting that start up challenge is to gather data on the $NO_x$ and $NH_3$ concentration from multiple locations at either the inlet or exit of the SCR catalyst.

Beyond the initial balancing, SCR systems can experience drift in the AIG performance. This can be caused by many system variables such as fouling of the injection nozzles, plugging of the ammonia transport lines, or shifts in the spatial distribution of the inlet $NO_x$ at the inlet to the SCR (or between different SCR modules). To identify that the AIG balance has drifted and to provide guidance for adjusting the AIG requires gathering of continuous data similar to that suggested above for initial AIG tuning.

Also, the reactivity of an SCR catalyst degrades over time. Typically, catalyst performance will remain acceptably high for periods of 3 to 10 years but occasionally the reactivity can decline precipitously. A sharp drop in reactivity can occur due to many factors including catalyst poisoning or delamination of a wash coat type catalyst. Data are required to track the long-term performance of the catalyst and to discriminate the root cause of falling $NO_x$ destruction efficiency between poor AIG performance, by passing of the catalyst, or loss of catalyst reactivity.

At least one known method for initial balancing of AIG systems is based on measurement of only $NO_x$ concentration distribution at an outlet of the catalyst, measurement of $NO_x$ destruction efficiency, or manual measurement of ammonia. This method has proven satisfactory for SCR systems that operate at sub-stoichiometric ammonia levels, but is less satisfactory for systems that operate at near 1:1 inlet $NO_x$ to ammonia ratio or for facilities with stringent ammonia slip regulatory limits. The known method also does not provide continuous monitoring to detect deterioration in AIG balancing.

Also, at least one known method physically extracts catalyst samples on a regular basis and subjects the catalyst to reactivity testing at a remote laboratory, but does not monitor catalyst performance during yearlong periods between major plant outages. Some indication of catalyst performance is provided through continuous measurement of overall $NO_x$ destruction efficiency but those data cannot distinguish the impacts of AIG tuning from catalyst reactivity.

BRIEF DESCRIPTION OF THE INVENTION

Some configurations of the present invention therefore provide a method for monitoring and/or controlling performance of a selective catalytic reduction (SCR) emission control system. The method includes injecting a quantity of a pollution neutralizing gas into a combustion gas stream containing a pollutant gas, passing the stream over a catalyst bed to facilitate a reaction of the pollution neutralizing gas with the pollutant gas to produce an effluent, and measuring a ratio of the pollution neutralizing gas to the pollutant gas in the effluent.

Various configurations of the present invention also provide an apparatus for monitoring and controlling performance of a selective catalytic reduction (SCR) emission control system. The apparatus is configured to measure a ratio of pollution neutralizing gas to pollutant gas in a flue gas stream effluent downstream of a catalyst, and adjust an injected quantity pollution neutralizing gas in a flow of gas including the pollutant gas upstream of or at the catalyst in accordance with the measured ratio.

Some configurations of the present invention provide a gas turbine combustion plant having a selective catalytic reduction (SCR) emission control system that includes a catalyst bed. The plant also includes a supply of a pollution neutralizing gas for reacting with a pollutant gas in the SCR system and a measuring system configured to measure a ratio of the pollution neutralizing gas to pollutant gas in an effluent of the SCR system.

Still other configurations of the present invention provide a fossil fuel-fired boiler having a selective catalytic reduction (SCR) emission control system. The SCR include a catalyst bed, and the plant also has a supply of a pollution neutralizing gas for reacting with a pollutant gas in the SCR system. A measuring system that is configured to measure a ratio of the pollution neutralizing gas to pollutant gas in an effluent of the SCR system is also provided.

As a catalyst (or its modules) age and reactivity falls off, configurations of the present invention are able to keep an outlet pollution neutralizing gas to pollutant gas ratio in a proper range, although the concentration of both gases will increase. Through such monitoring, a drop off in catalyst reactivity can be segregated from injection gas maldistribution, thus allowing the catalyst life to be extended to its maximum limit. Moreover, using some configurations of the present invention, operators can identify whether all or only part of a catalyst bed or only one or a few modules need replacement. This identification permits catalyst replacement to be scheduled at an optimal time for facility operation while maintaining compliance with all environmental regulatory requirements.

DETAILED DESCRIPTION OF THE INVENTION

Figure 1:
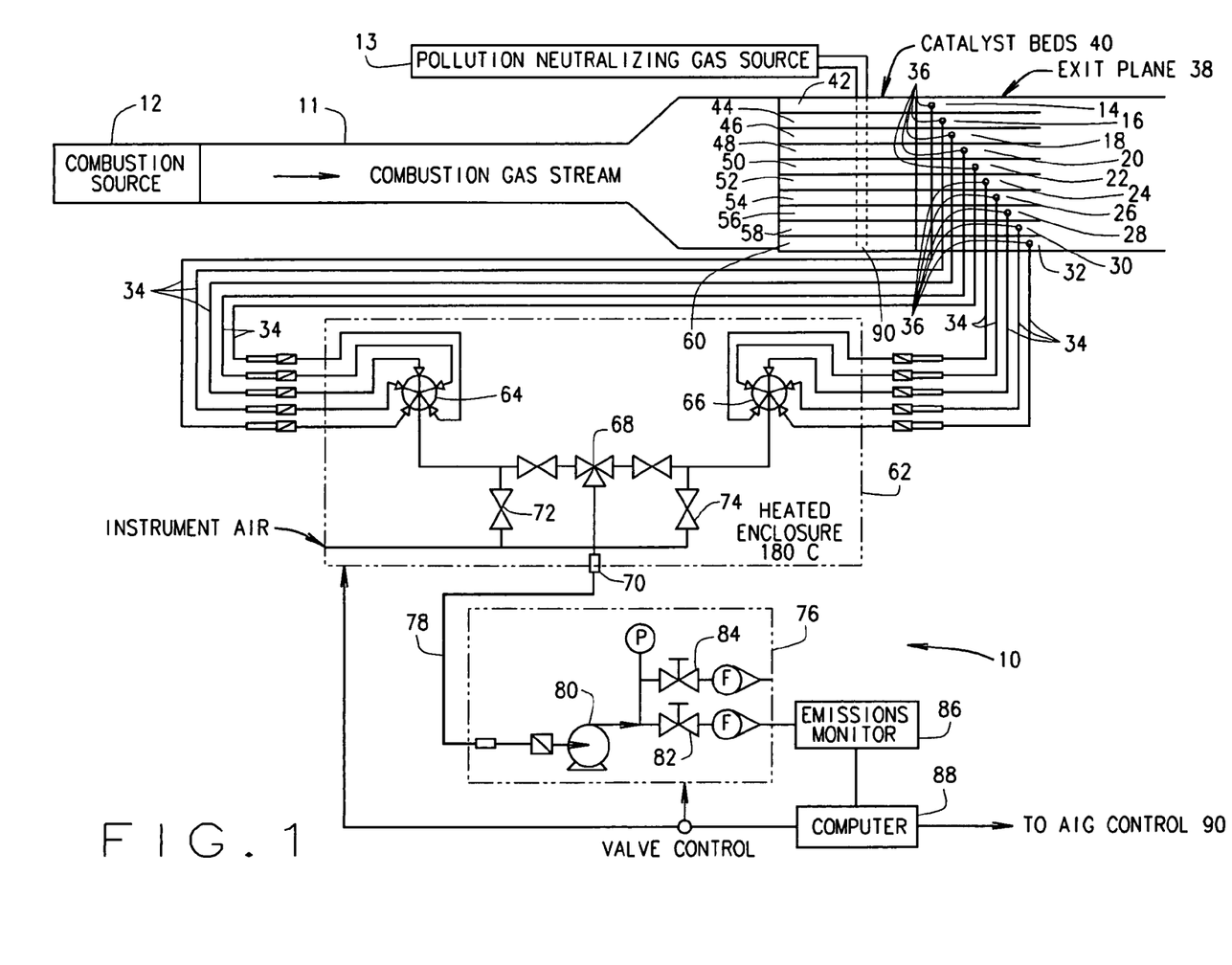
FIG. 1 is a schematic diagram representative of various configurations of an apparatus of the present invention for measuring and controlling a selective catalytic reduction (SCR) emission control system.

In some configurations of the present invention and referring to FIG. 1, a selective catalytic reduction (SCR) measuring and control system 10 is provided for reducing pollution from a combustion source 12. A non-exhaustive list of such combustion sources includes gas turbine combustion sources, fossil fuel-fired combustion sources, and industrial processes (for example, quartz manufacturing). Combustion source 12 produces a combustion gas stream containing a pollutant gas, for example, $NO_x$. A quantity of a pollution neutralizing gas 13 (e.g., $NH_3$) is injected into combustion gas stream 11 at or upstream from a catalyst 40 using an injection grid 90 such as an ammonia injection grid (AIG) 90.

(It is recognized that ammonia is considered a hazardous air pollutant in many states. However, referring to ammonia as a "pollution neutralizing gas" should not result in any confusion to one of ordinary skill in the art. Ammonia is referred to herein as a "pollution neutralizing gas" and $NO_x$ as a "pollutant gas" because the "pollutant gas" is produced as a consequence of combustion, whereas the "pollution neutralizing gas" is deliberately introduced in controlled quantities to react with the pollutant gas, thereby producing harmless reaction products. The use of the terms "pollution neutralizing gas" and "pollutant gas" herein helps make evident that the present invention is not limited solely to configurations in which $NO_x$ is the pollutant gas and ammonia is the pollution neutralizing gas.)

Measurements are taken at a plurality of different locations. In some configurations, for example, samples are taken at ten different locations 14, 16, 18, 20, 22, 24, 26, 28, 30, and 32. Heated stainless steel sampling lines 34 are used for these measurements. Probes 36 at the ends of sampling lines 34 are positioned at different locations 14, 16, 18, 20, 22, 24, 26, 28, 30, and 32 on an exit plane 38 of a catalyst bed 40 or downstream of separate catalyst modules 42, 44, 46, 48, 50, 52, 54, 56, and 58 that comprise catalyst 40 in some configurations. Probes 36 are thus configured to sample a flue gas stream effluent downstream of catalyst 40.

In some configurations, each probe 36 is filtered to capture small particles (e.g., all small particles>2 μm). Samples from probes 36 are brought via sampling lines 34 into a weatherproof box 62 that is heated to a constant temperature greater than 125° C. and mounted on the side of the SCR. Each line 34 is routed to one of two rotary valves 64 or 66, each of which is equipped with five inlets and one outlet. The outlets from rotary valves 64 and 66 are routed through a three-way valve 68 and from there to an outlet 70 of heated box 62. By appropriately positioning rotary valves 64 and 66 and three-way valve 68, each line 34 is isolated as sample gas is extracted from each individual probe 36 of the plurality of sampling probes. Also in some configurations, each sampling line 34 is flushed when not in use using instrument air (i.e., compressed air) and appropriate valves 72 and 74 to avoid diluting the active sample line with instrument air. Actuators (not shown) for rotary valves 64 and 66 and three-way valve 68 are located in a separate weather-proof enclosure (not shown) that is freeze protected.

It will be recognized that alternate plumbing configurations can be used in conjunction with various configurations of the present invention. By way of example and not by way of limitation, it may be advantageous in some configurations to utilize a 2-position, 4-port valve in place of three-way valve 68.

After exiting heated box 62, sample gas is transported from the side of the SCR to a remote instrument housing 76 using a heated sampling line 78 that is also operated at 180° C. In housing 78, the heated sample passes through a heated head sampling pump 80 and appropriate valves (e.g., 82 and 84) to control the sample flow and pressure delivered to an emissions monitor 86. In some configurations, monitor 86 provides simultaneous measurement of $NO_x$, $NO_2$ and $NH_3$, and measurements are made on a hot wet basis to avoid requiring flow conditioning systems such as chillers that can cause $NH_3$ and/or $NO_2$ to condense and drop out of the sample stream prior to analysis. Also, monitor 86 in various configurations provides sufficient sensitivity to determine single digit concentrations, and span calibration for all three species using calibration cells rather than requiring special span gases, which can be expensive and introduce additional analysis error. In some configurations, monitor 86 is all digital and equipped with Ethernet capabilities for communication with both on-site and remote data storage and analysis systems. Also in some configurations, measurements of $NO_2$ and $NH_3$ are accomplished directly by monitor 86, without the need to process samples with converters such as is required by chemiluminescent analyzers (an alternative measurement technique).

In other configurations, however, any suitable analysis method can be by monitor 86 that provides continuous, simultaneous determination of NO, $NO_2$, and $NH_3$ concentration in a reliable manner at low concentration levels. In some configurations, monitor 86 can be replaced by manual monitoring and testing. As used herein, "low-concentration" refers to $NO_x$ and $NH_3$ levels in a low single digit ppm range.

In some configurations, data from the analyzer are directed to a dedicated computer 88 that stores the appropriate data streams and controls positioning of the various valves in heated box 62 on the SCR.

In some configurations of the present invention, data are sequentially collected from each sampling probe 36 for a period of up to one hour. This sampling period is based on the absorption and desorption dynamics of SCR catalysts operating in the 300° C. range. A shorter sampling period can be used for SCR systems processing higher temperature flue gas. Dedicated computer 88 in some configurations determines, records, and reports a time-averaged ratio of $NH_3/NO_x$ as well as the actual value of all three measured species.

By comparing data from each sampling location 14, 16, 18, 20, 22, 24, 26, 28, 30, and 32 (either manually or utilizing software or firmware to control computer 88), all necessary information is provided to guide manual balancing of ammonia injection grid (AIG) 90 or for control computer 88 to generate control signals for automatic adjustment of motorized drives on AIG valves.

More particularly, ratios of $NH_3/NO_x$ concentrations at catalyst 40 exits (in some configurations, time averaged ratios) as sampled by probes 36 provide direct information on the tuning of AIG 90 and allow a technician to determine which ammonia nozzle (or nozzles) of AIG 90 requires adjustment and in which direction. Some configurations of the present invention also provide continuous monitoring of the actual ammonia and NOx concentration. As catalyst 40 (or its modules) age and reactivity falls off, the outlet $NH_3$ to $NO_x$ ratio will remain in the proper range as long as AIG 90 is balanced, although the concentration of both pollutants will increase. Through such monitoring, the drop off in reactivity can be segregated from AIG 90 maldistribution, thus allowing catalyst 40 life to be extended to its maximum limit. Moreover, using some configurations of the present invention, operators can identify whether all or only part of a catalyst bed 40 or only one or a few modules need replacement, renewal, or adjustment. This identification permits catalyst 40 replacement to be scheduled at an optimal time for facility operation while maintaining compliance with all environmental regulatory requirements.

For manual SCR systems, adjustment of AIG 90 balance may be required only infrequently. For other SCR systems, however, it may be appropriate to adjust AIG 90 any time there is a big swing in the facility 12 load. Thus, configurations of the present invention may be practiced in either a feed forward or a feedback control mode. In some configurations, AIG 90 injects a quantity of a pollution neutralizing gas (e.g., $NH_3$) in a flow of gas upstream or at catalyst 40. The injected quantity of pollution neutralizing gas is adjusted in accordance with a determined ratio of the pollution neutralizing gas to the pollutant gas (e.g., $NO_x$). In some configurations, the determined ratio is a time-averaged ratio. Also, the injected quantity of pollution neutralizing gas is adjusted separately at different injection locations (e.g., at or upstream from different portions of catalyst 40 bed or at or upstream of different catalyst modules comprising catalyst 40). The separate adjustments are each in accordance with ratios determined from corresponding probe 36 locations.

Figure 2:
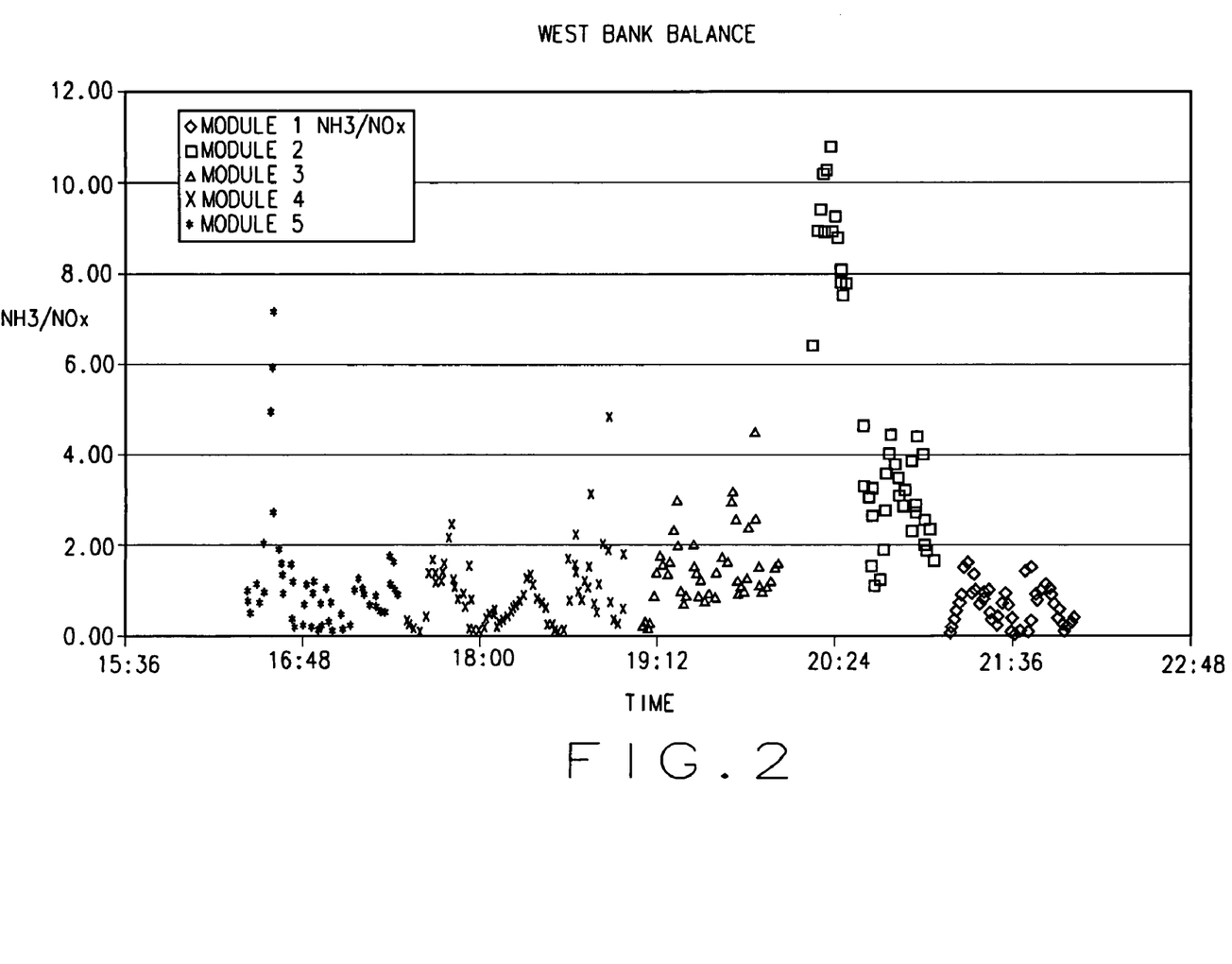
FIG. 2 is a graph showing actual $NH_3/NO_x$ ratio data gathered on a single day at an industrial facility from five modules out of ten using a configuration of the present invention.
Figure 3:
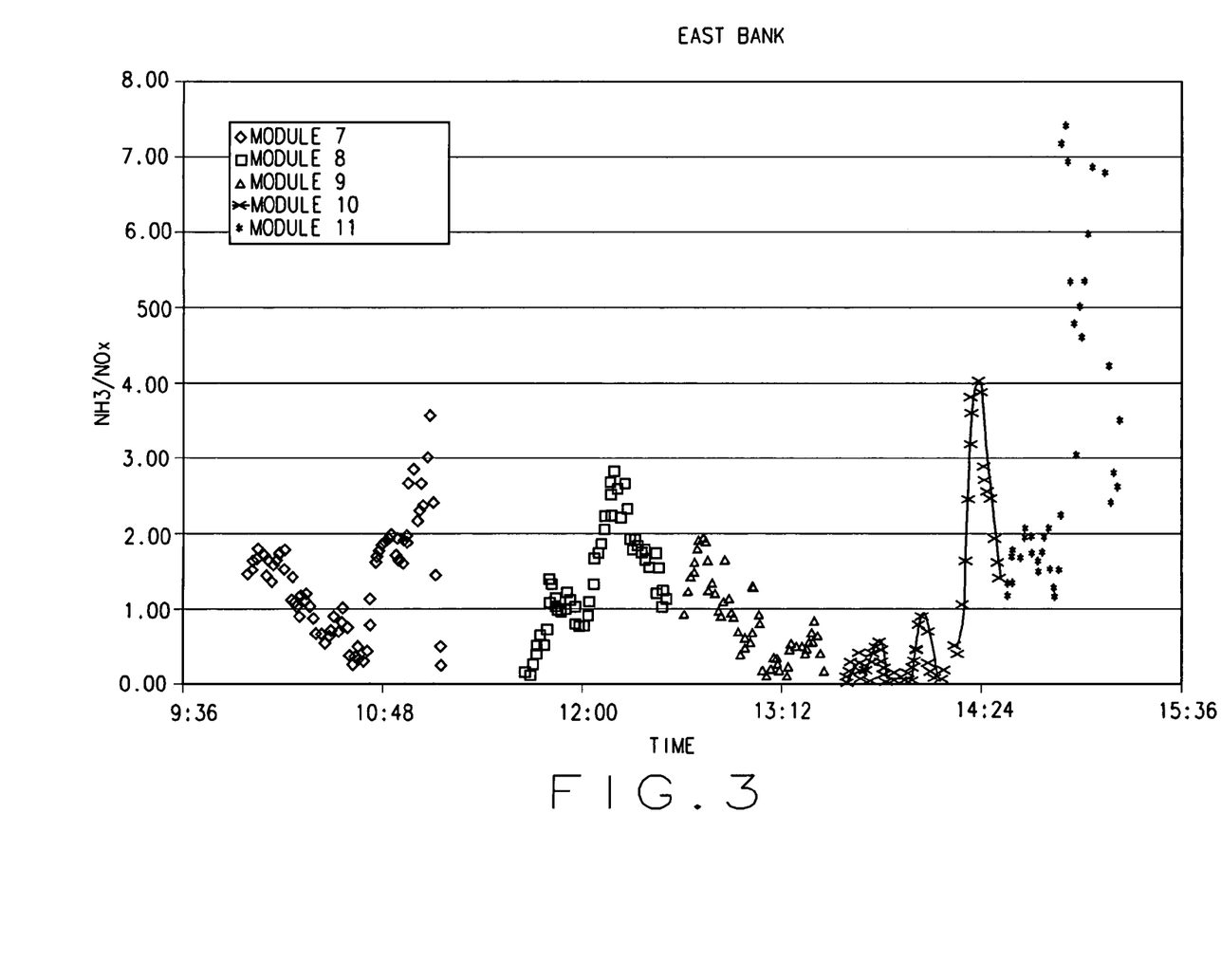
FIG. 3 is a graph showing actual $NH_3/NO_x$ ratio data gathered on the same day as the data shown in FIG. 2 at an industrial facility from the remaining five modules out of ten using a configuration of the present invention.

A configuration of the subject invention has been developed and implemented in a non-automated fashion on an SCR system at a quartz manufacturing facility in Hebron, Ohio. The SCR system at this facility consists of ten separate modules, each processing 1/10 of the total flue gas generated at the facility. A metered, total quantity of ammonia reagent is delivered to the SCR system and then distributed to each module. Manual control valves are provided upstream to the ammonia spargers that distribute the reagent to each module. The ten modules are arranged in two banks of five SCR modules, which are referred to as the "East bank" and the "West bank." Modules on the West bank are designated as modules 1-5 whereas modules on the East bank are designated as Modules 6-11. Data in FIG. 2 and FIG. 3 show actual $NH_3/NO_x$ ratio data gathered from below each of the ten modules on the same day. Similar data had been gathered a week earlier and used to provide rough initial balancing of the ammonia delivery to each module. As shown by the data in FIG. 2 and FIG. 3, initial balancing was not perfect. Modules 2 and 11 have excess ammonia whereas other modules are slightly ammonia starved. Data such as that shown in FIG. 2 and FIG. 3 have been used to further fine-tune the AIG balancing.

Figure 4:
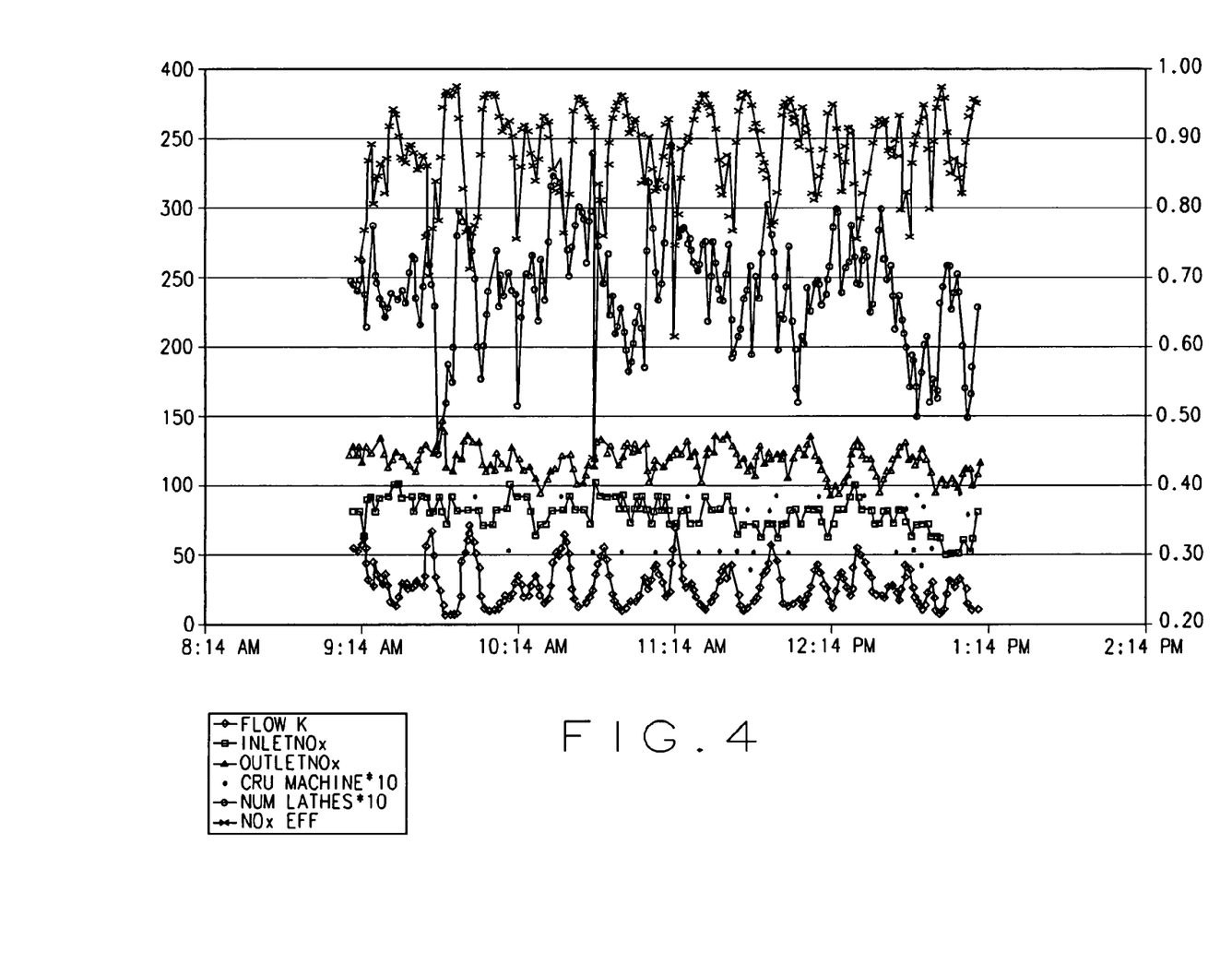
FIG. 4 and FIG. 5 are graphs showing overall SCR efficiency data gathered for several hours on different days prior to an initial AIG balancing.
Figure 5:
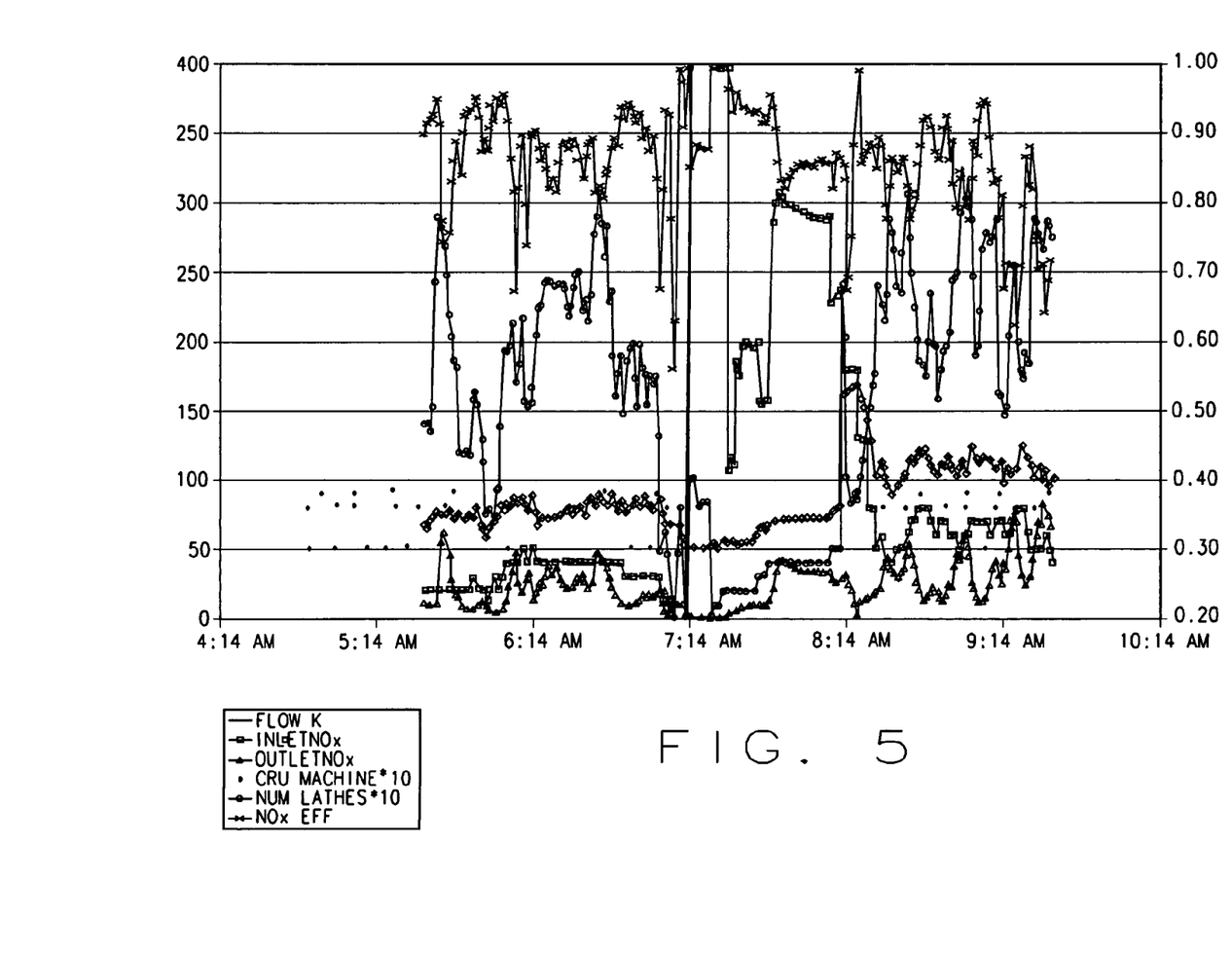
Figure 6:
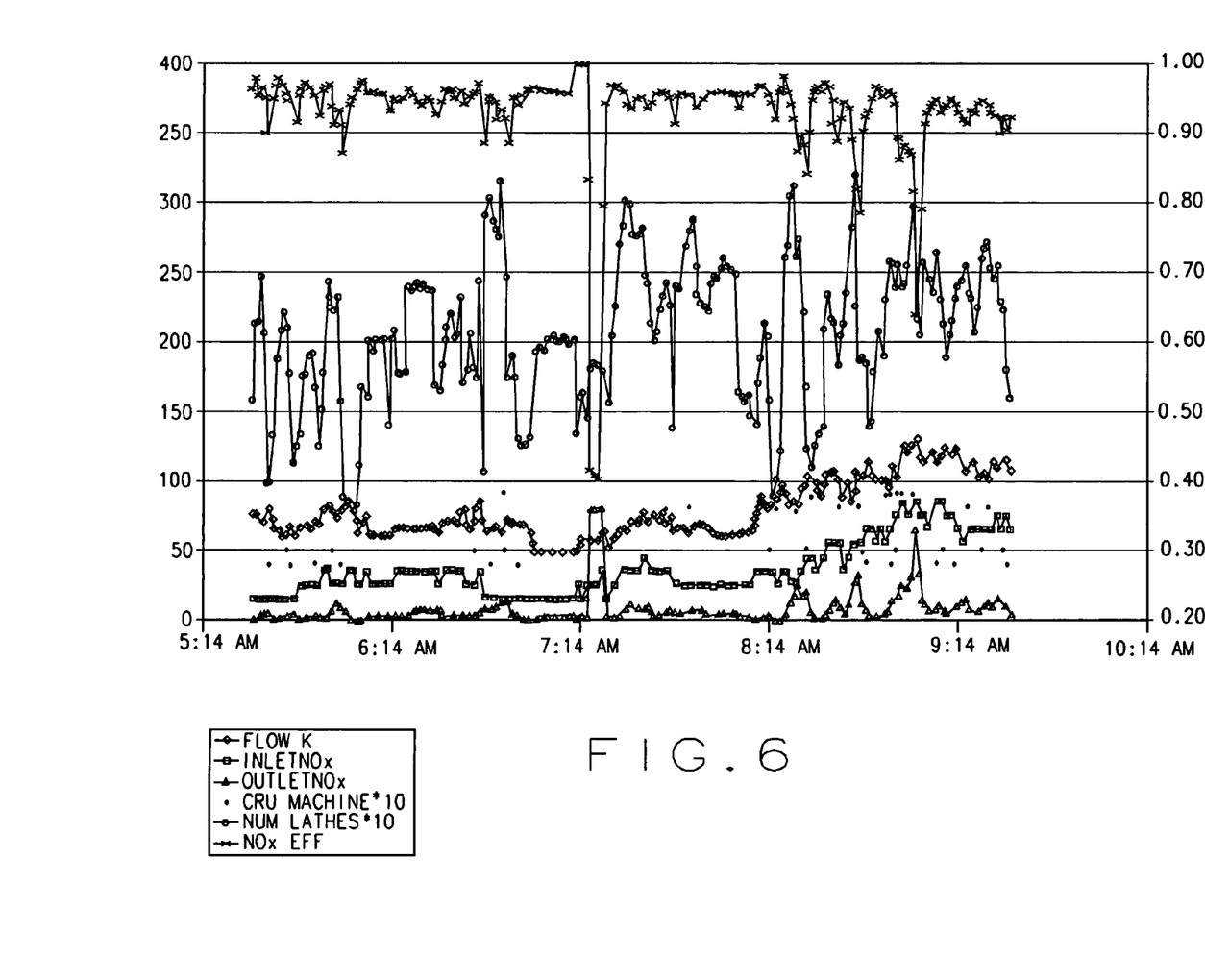
FIG. 6 and FIG. 7 are graphs showing overall SCR efficiency data gathered for several hours on different days following an initial AIG balancing as provided in a configuration of the present invention.
Figure 7:
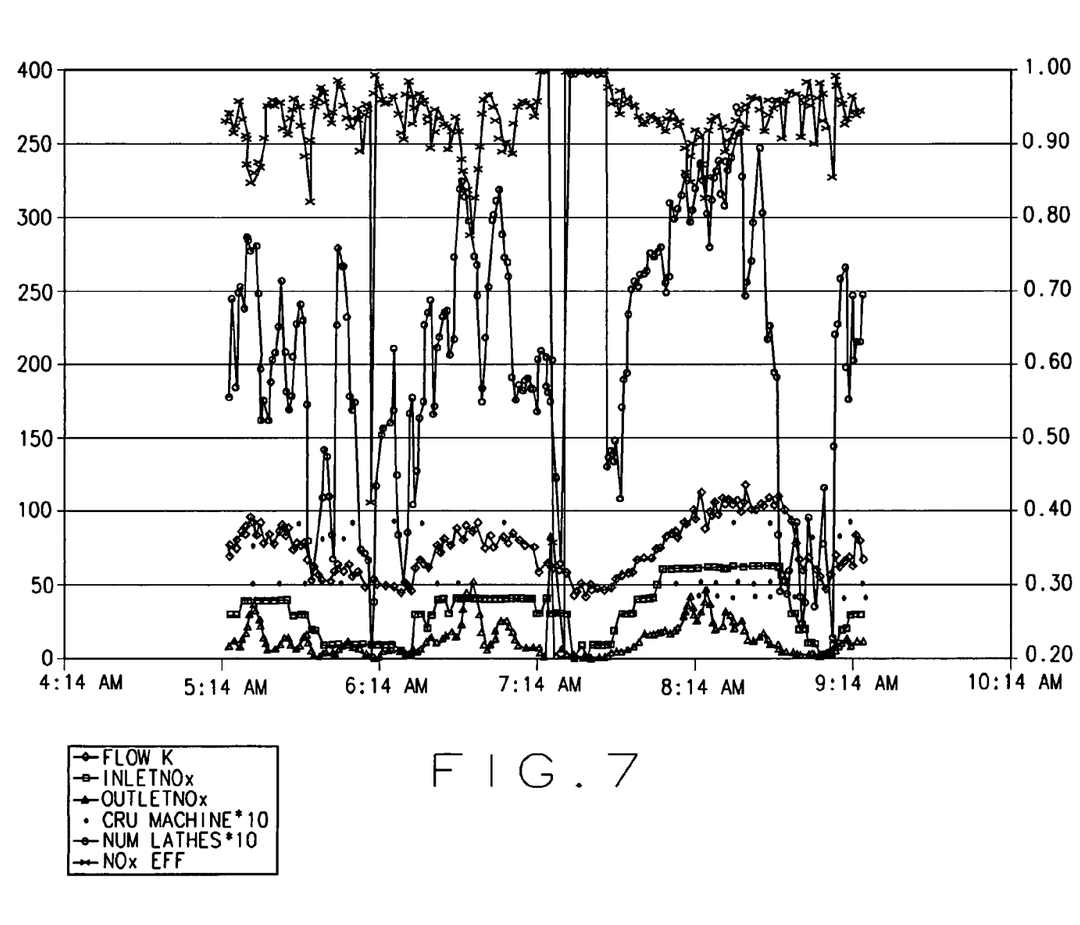

To determine the impact of AIG balancing, overall SCR efficiency data were gathered for several hours on two separate days prior to the initial balancing and for two days following the initial course balancing. Data presented in FIG. 4 and FIG. 5 were gathered prior to the balancing while the data in FIG. 6 and FIG. 7) followed the initial tuning. The line at the top of each figure indicates the SCR $NO_x$ destruction efficiency. Each figure covers a period during which the facility inlet and outlet $NO_x$ monitors were being calibrated, resulting in short periods of spurious calculated efficiency data. A comparison of the efficiency data in FIG. 4 and FIG. 5 with the data in FIGS. 6 and 7 shows a dramatic improvement in efficiency. An approximately 6 to 8 percent improvement in average $NO_x$ destruction efficiency was achieved through this initial tuning step. Subsequent tuning can improve the overall AIG balance with smaller, but still significant, improvement in $NO_x$ control efficiency.

Configurations of the present invention can be applied to a wide spectrum of SCR installations, such as stationary gas turbines equipped with SCR and stationary diesel engines that require SCRs. Also, configurations of the present invention can be used to drive a service business for helping customers control and optimize performance of their SCR systems. In some configurations of the present invention, these adjustments can be performed manually but in others, the AIG adjustment is perfromed automatically.

While the invention has been described in terms of various specific embodiments, those skilled in the art will recognize that the invention can be practiced with modification within the spirit and scope of the claims.

What is claimed is:

1. A method for monitoring and/or controlling performance of a selective catalytic reduction (SCR) emission control system, said method comprising:

directing a combustion gas stream containing a pollutant gas over a catalyst bed;

injecting a quantity of a pollution neutralizing gas into the combustion gas stream at a plurality of injection locations upstream from the catalyst bed to form a predetermined ratio of the pollution neutralizing gas to the pollutant gas, wherein the catalyst bed facilitates a reaction of the pollution neutralizing gas with the pollutant gas to produce an effluent;

sampling the effluent at a plurality of sample locations across the catalyst bed;

channeling at least one sample of effluent from each sample location of the plurality of sample locations to an enclosure, wherein the sample is heated to a first temperature;

channeling the sample of effluent to an instrument at a second temperature that is approximately equal to the first temperature;

measuring, substantially simultaneously, the concentration of the pollution neutralizing gas and the pollutant gas in the effluent;

determining a ratio of the pollution neutralizing gas to the pollutant gas in the effluent at each of the plurality of sample locations;

adjusting the quantity of injected pollution neutralizing gas at one or more of the plurality of injection locations to cause the determined ratio at each of the plurality of sample locations to be substantially equal to the predetermined ratio; and replacing at least a portion of the catalyst bed when the measured concentration of the pollution neutralizing gas or the pollutant gas exceeds a predetermined amount.

2. A method in accordance with claim 1 wherein the pollutant gas comprises NOx and said pollutant neutralizing gas comprises NH3.

3. A method in accordance with claim 1 wherein the SCR is installed for control of polluting emissions from a gas turbine combustion source.

4. A method in accordance with claim 1 wherein the SCR is installed for control of polluting emissions from a fossil fuel-fired boiler.

5. A method in accordance with claim 1 wherein the SCR is installed for control of polluting emissions from an industrial process.

6. A method in accordance with claim 5 wherein the industrial process is quartz manufacturing.

7. A method in accordance with claim 1 wherein said determining a ratio comprises determining a time-averaged ratio.

8. A method in accordance with claim 7 wherein said adjusting the quantity of injected pollution is performed using a computer.

9. A method in accordance with claim 1 further comprising channeling at least one sample of effluent from a plurality of different locations on an exit plane of the catalyst bed.

10. A method in accordance with claim 9 further comprising:
   injecting a quantity of a pollution neutralizing gas through a plurality of injection nozzles; and
   adjusting the quantity of pollution neutralizing gas injected through each of the plurality of injection nozzles in accordance with the determined ratios of each sampled location.

11. A method in accordance with claim 10 wherein the determined ratios are time-averaged ratios.

12. A method in accordance with claim 1 wherein said determining a ratio of the pollution neutralizing gas to the pollutant gas in the effluent comprises determining a ratio of the pollution neutralizing gas to the pollutant gas at outlets of a plurality of catalyst modules.

13. A method in accordance with claim 12 further comprising adjusting the quantity of injected pollution neutralizing gas to each catalyst module in accordance with the determined ratios.

14. A method in accordance with claim 13 wherein the determined ratios are time-averaged ratios.

15. A method in accordance with claim 1 further comprising sampling the effluent at a plurality of locations to measure a plurality of ratios, and filtering each sample.

16. A method in accordance with claim 15 further comprising selectively sampling an effluent at one location of the plurality of locations at any given time.

17. A method in accordance with claim 15 further comprising filtering each sample to include particles less than 2 micrometers ($\mu$m).

18. A method in accordance with claim 15 wherein said sampling comprises operating a plurality of valves housed in the enclosure, and further comprising delivering the selected effluent sample to the instrument in a separate housing remote from said enclosure via a heated sampling line.

19. A method in accordance with claim 1 wherein said pollutant gas comprises NOx and said pollutant neutralizing gas comprises NH3.

20. A method in accordance with claim 19 wherein the SCR is installed for control of polluting emissions from a gas turbine combustion source.

21. A method in accordance with claim 19 wherein the SCR is installed for control of polluting emissions from a fossil fuel-fired boiler.

22. A method in accordance with claim 19 wherein the SCR is installed for control of polluting emissions from an industrial process.

23. A method in accordance with claim 22 wherein the industrial process is quartz manufacturing.

* * * * *